(12) United States Patent
MacGibbon et al.

(10) Patent No.: US 6,192,922 B1
(45) Date of Patent: Feb. 27, 2001

(54) AIRFLOW CONTROL VALVE FOR A CLEAN ROOM

(75) Inventors: Bruce S. MacGibbon, Lake Oswego; Mark C. Wolochuk; Lee I. Wolochuk, both of Portland; Christopher P. Sirovy, Beaverton; James F. LeBaron, Portland; Jeffrey W. Yarroll, Salem, all of OR (US)

(73) Assignee: Synetics Solutions Inc., Tigard, OR (US)

( * ) Notice: Subject to any disclaimer, the term of this patent is extended or adjusted under 35 U.S.C. 154(b) by 0 days.

(21) Appl. No.: 09/323,591

(22) Filed: Jun. 1, 1999

(51) Int. Cl.[7] .................................. G05D 7/06; F16K 3/08
(52) U.S. Cl. ............... 137/486; 137/625.31; 137/630.21; 137/630.22; 251/65; 454/61
(58) Field of Search .............................. 137/486, 625.31, 137/630.21, 630.22; 251/65; 454/61

(56) References Cited

U.S. PATENT DOCUMENTS

| | | |
|---|---|---|
| 1,806,530 * | 5/1931 | Giesler ........................ 137/625.31 X |
| 3,347,262 * | 10/1967 | Gibson .............................. 251/65 X |
| 4,000,754 | 1/1977 | Risk . |
| 4,026,321 | 5/1977 | Kahoe et al. . |
| 4,277,832 | 7/1981 | Wong . |
| 4,554,943 * | 11/1985 | Claney et al. .............. 137/625.31 X |
| 5,107,886 | 4/1992 | Taylor . |
| 5,190,068 | 3/1993 | Philbin . |
| 5,218,998 | 6/1993 | Bakken et al. . |
| 5,220,940 | 6/1993 | Palmer . |
| 5,251,665 | 10/1993 | Schaufeld . |
| 5,304,093 | 4/1994 | Sharp et al. . |
| 5,320,124 | 6/1994 | Palmer . |
| 5,456,280 | 10/1995 | Palmer . |
| 5,518,446 * | 5/1996 | Jacob ..................................... 454/61 |
| 5,582,203 | 12/1996 | Palmer . |
| 5,597,011 | 1/1997 | Palmer . |
| 5,634,490 | 6/1997 | Palmer . |
| 5,664,600 | 9/1997 | Palmer . |
| 5,669,408 | 9/1997 | Nishino et al. . |

\* cited by examiner

*Primary Examiner*—Gerald A. Michalsky
(74) *Attorney, Agent, or Firm*—Miller Nash LLP

(57) ABSTRACT

An airflow control valve for a clean room having a duct section with a damper positioned within the duct. The damper being capable of an adjustment from an open position to a closed position. The opening and closing of the duct is accomplished through a magnetic coupling such that the duct can remain sealed during operation. The airflow control valve includes a sensor for measuring the airflow rate, so that the duct can be adjusted to maintain one or more predetermined flow rate set-points.

7 Claims, 6 Drawing Sheets

FIG. 4

AIRFLOW CONTROL VALVE FOR A CLEAN ROOM

TECHNICAL FIELD

The invention described in this document generally relates to controlling the airflow into clean rooms and small clean room enclosures ("minienvironments") of the sort used in silicon wafer manufacturing. More specifically, the invention relates to airflow control valves or dampers for controlling, maintaining and monitoring the flow of air through manufacturing environments such as clean rooms and minienvironments that require precise control of airflow and exhaust.

BACKGROUND INFORMATION

Many manufacturing applications rely on a heating, ventilating, and air conditioning ("HVAC") system to control environmental conditions such as temperature and humidity, or to provide ventilation or exhaust of hazardous fumes. In such systems, the air flow is typically controlled using dampers located at various points within ducts in the HVAC system. These dampers may be, for example, gate valves, butterfly valves, or blast valves, and may be fixed, adjustable or motorized. By increasing or decreasing the amount of airflow resistance or dampening, the airflow can be decreased or increased, respectively, in a particular region.

There are many factors, however, that contribute to the airflow rate in addition to the dampening, including the HVAC system pressure and the speed at which exhaust fans are operating. Furthermore, when the amount of dampening is changed in a particular damper, the pressure throughout the entire HVAC system will change, thereby affecting the flow rate through the other dampers in the system. While such variation is acceptable in some manufacturing applications, in others, such as minienvironments used in silicon wafer manufacturing or semiconductor integrated-circuit chip manufacturing, the amount of airflow and exhaust must be precisely controlled.

Minienvironments are used to house many of the process tool operations that are used in the silicon wafer and semiconductor integrated-circuit chip manufacturing industries. The typical minienvironment has two fundamental purposes. First, it provides the ability to maintain an extremely clean manufacturing space. Second, it provides containment and control of chemical vapors that are generated in many wafer-manufacturing and chip-manufacturing operations. It is well known that the delivery and control of the airflow through the minienvironment impacts both cleanliness and chemical containment. It is extremely important that the volumetric airflow though a minienvironment be controlled and maintained at a precise and continuous rate because 1) fluctuations in the airflow or exhaust can adversely affect the product being manufactured, and 2) the manufacturing process often involves the use of chemicals that produce hazardous fumes that must be ventilated to ensure the safety of operators and avoid damage to related machinery and systems. In many such applications, the amount of airflow should optimally not vary by more than +/−5 percent from a set-point.

The typical approach to regulating airflow uses dampers such as gate valves, butterfly valves, or blast valves in HVAC systems at the respective locations where the airflow is supplied to and exhausted from the minienvironment. The typical minienvironment is configured as shown in the FIG. 1 schematic. Supply air is supplied into the minienvironment by a fan-filter unit. As a person familiar with minienvironments would know, the fan in the module drives air through a suitable filter and then into the process area within the minienvironment. The air is exhausted through an exhaust duct to a scrubber (air may also be exhausted through other openings in the minienvironment). The exhaust duct may also have an adjustable damper.

In a typical minienvironment, air is not only driven through the minienvironment by the fan-filter unit, but also drawn from the minienvironment by a downstream exhaust fan. Both of these components affect the overall airflow in the minienvironment and must be adjusted relative to each other to obtain a desired equilibrium.

A wet bench is another example of a manufacturing application requiring precise control of airflow. A wet bench is a minienvironment process tool that is used to chemically clean silicon wafers. There are two basic airflow-balancing scenarios for a wet bench. One involves a standard "cool" tank where chemicals in the tank are generally maintained at a temperature below 90 degrees Celsius. In this scenario, desired airflow is achieved by first adjusting the exhaust damper to approximately 180 cfm. This step is followed by setting the fan filter speed such that the pressure inside the minienvironment is less than 0.001 in. w.g. but greater than 0.0002 in. w.g. The exhaust flow rate is then checked against the desired flow rate, and the process repeated if necessary. The second scenario in a wet bench involves a "hot" tank containing chemicals (typically phosphoric acid) that are maintained at a temperature above 160 degrees Celsius. In the second scenario, desired airflow is achieved by first adjusting the exhaust damper to 400 cfm followed by setting the fan filter speed to create the same range of positive pressure inside the minienvironment (i.e., less than 0.001 in. w.g. but greater than 0.0002 in. w.g.). The exhaust flow rate is then checked against the desired flow rate, and the process repeated if necessary. It should be understood that these settings are typical.

One problem with maintaining accurate airflow in systems is in balancing the airflow through different regions. The airflow in such a system is balanced by first adjusting the exhaust flow via the damper, and then adjusting the fan speed in the fan-filter unit until a slightly positive pressure is created inside the minienvironment. The balancing process typically requires repeatedly readjusting the dampers and fan speed in sequence until the flow rate reaches an equilibrium that is within an acceptable range. Such a balancing method is time consuming, tedious, prone to inaccurate settings, and not responsive to external changes in the airflow supply system. Furthermore, after the balancing is completed, the entire HVAC system is still subject to changes in supply or exhaust pressure and to changes in the demand requirements of various components of the HVAC system, any of which could require having to rebalance the system.

Another problem that arises in large manufacturing applications that have multiple minienvironments and complex HVAC systems, is balancing the overall system and providing feedback and information regarding the current state of operations to the equipment and facility operators. Due to many factors, a balanced process tool can eventually become "unbalanced" and corrupt the manufacturing process inside the minienvironment. Furthermore, it is typically not known how changes in damper or fan speed settings of a particular subsystem or minienvironment will affect the HVAC system in general, or particular subsystems. Such effects can only be determined by making individual measurements at discrete locations within the HVAC system, and making changes as necessary, which changes may cause still further effects at other locations within the HVAC system.

Another problem with some manufacturing applications is the presence of chemicals or fumes that are acidic or alkaline that can react with, or otherwise adversely affect, dampers or controls in the HVAC system. Such chemicals or fumes can, for example, corrode dampers or controls that are in contact with the chemicals in the airflow, causing them to operate incorrectly. In addition, the escape from the system of noxious gases can cause a safety problem for workers using or maintaining the equipment. Accordingly, there is a need to have a valve system capable of being completely sealed to prevent release of internal gases.

Another problem with some manufacturing applications is retrofitting existing systems to provide automated measurement and control systems. Many such systems have existing ducts of varying sizes. Accordingly, there is a need for a valve system that is modular and compact that can be installed in existing systems.

Consequently, there is a need for automated monitoring controls that can quickly and automatically respond to minor airflow fluctuations and make adjustments before the volumetric airflow rate deviates outside acceptable operating parameters. An important part of an automated control system involves the use of hardware that can physically adjust airflow quickly and accurately to respond to changes in the HVAC system or to needs of a particular minienvironment. There is also a need for such a system to be able to provide feedback and status information both locally and remotely, such as at a central processing location, so that the entire HVAC system can be monitored and controlled from a remote location.

There is also a need for the "wetted" components of such a control system to be resistant to damage that could be caused by chemicals likely to be present in the exhaust of particular manufacturing applications and to be able to provide a seal to prevent escape of such chemicals from the valve and control system. The "wetted" components are those components, such as the dampers, the interior of the duct, and the pressure sensors that are in direct contact with the airflow and chemicals that may be present in the airflow.

Finally, there is a need to be able to retrofit existing plants with such an automated control system. The invention disclosed below is an improved exhaust valve design that provides these capabilities.

SUMMARY OF THE INVENTION

The present invention provides a system that precisely maintains airflow within a user-specified range from an airflow supply through an environment such as a process chamber to an exhaust. The user could either specify a range or, more typically, specify a set-point, which the valve automatically controls within the accuracy of the system. Either way, the practical effect is that the airflow is maintained within a user-specified range. Furthermore the system is more resistant to corrosive chemicals in the airflow than present systems and may be electrically connected to other control and measurement systems within an overall manufacturing environment to allow control and monitoring of an entire manufacturing HVAC system or subsystem from a single location.

The present invention is a self-contained airflow control system that is installed in-line between a process tool or minienvironment and a manufacturing facility airflow supply duct connected to or constituting part of an HVAC system. The present invention determines and automatically adjusts the volumetric flow rate of the air to maintain the flow rate within a user-defined range or at a set-point. If there is a fluctuation in either the supply or exhaust pressure that would affect the flow rate through a particular environment, the present invention will detect the flow rate change, and immediately and automatically respond and adjust the flow rate to maintain it within the specified range.

The present invention uses a mechanical damper in combination with a volumetric flow rate sensor that provides data to an electronic control system connected to the damper. The control system allows the damper to be adjusted in response to measured changes in the volumetric flow rate.

One embodiment of the invention uses a damper that comprises a plurality of plates that are located within and perpendicular to the axis of an airflow duct that is circular in cross-section. The plates are arranged so as to be adjacent to each other and rotatably engaged with each other. Each of the plates has a plurality of openings through which air can pass. The amount of open area of each plate is equal to approximately $(n-1)/n$ of the area of the plate, where n is the number of plates. One of the plates is fixed. The others may be rotated relative to the fixed plate. The openings in the plates are sized and arranged so that when the plates are rotated relative to the fixed plate into a first position such that the openings of each plate are aligned with the openings of each of the other plates, the damper is in a first most "open" position, in which the maximum airflow is allowed. In this first position, the size of the obstruction, or damper, to the airflow is essentially $1/n$ where n is the number of plates.

When one of the plates is rotated relative to the other plates, a portion of the openings of the other plates is blocked by the solid portion of the rotating plate. When the rotating plate is rotated into a second position such that the solid portion is not aligned with the solid portions of the other plates, the total size of the obstruction of the plates is $2/n$, where n is the number of plates. Therefore, if there are only two plates, this position results in an essentially blocked airflow.

If there are three plates, the airflow is ⅔ blocked when the solid portions of the first plate and the solid portions of the second plate are not aligned. When all three plates are in a final non-aligned position, the airflow is essentially blocked.

The plates may be constructed and assembled in such a way so as to be rotatable using a means that does not require a penetration into the duct. A non-penetrating method of control allows the maintenance of the integrity of the duct and prevents seepage from the duct of chemicals or fumes that may be present in the airflow. One such non-penetrating method of rotating the plates is a magnetic drive system. In such a system magnets are installed on at least one of the plates, such that it can be magnetically coupled with at least one magnet on the exterior of the duct. When the exterior magnet is rotated around the perimeter of the outer surface of the duct, the plate or plates will be caused to rotate within the duct. One method of rotating the exterior magnet around the exterior of the duct is to attach the exterior magnet to a ring that is concentric and rotatably engaged with the duct. The ring can then be driven using a gear or rack-and-pinion system driven by a motor, preferably a stepper motor. Other non-penetrating methods of coupling an external drive system with the internally located plates are possible. Provided the plates are fabricated from a material that is impervious to, or at least not susceptible to damage caused by, the chemicals in the airflow, such as, for example, polypropylene or stainless steel coated with HALAR or TEFLON, the entire mechanical damper system will not be susceptible to damage caused by the chemicals.

In one embodiment, the airflow measurement system comprises a plurality of pressure ports, dispersed around the perimeter of the duct. The more pressure ports that are used, the more accurate the pressure readings will be. Signals from the pressure ports are fed into an electronic system that can calculate the airflow based on the known diameter of the duct. The control system may use a programmable logic circuit ("PLC") to aid in this calculation. This control system is likely to be housed in an electrical enclosure located on or near the valve. The control system may have controls that allow the entry of desired volumetric flow rate and a real-time display of the flow rate past the pressure measurement ports.

When the control system detects that the flow rate has moved out of the desired range, it sends a signal to the damper control mechanism to either open or close the damper depending on whether the airflow rate needs to be increased or decreased. The damper plates will then be rotated relative to each other by a predetermined incremental amount. If after a predetermined amount of time, the flow rate is still not within the desired range, another signal is sent to the damper control mechanism to effect another rotational adjustment of the plates. The feedback and control sequence is then continuously and automatically repeated until the flow rate is within the desired range.

As described in more detail in the section setting forth Best Mode For Carrying Out The Invention, one way in which the plates could be moved is through use of a stepper motor that drives a rotatable shaft, and in turn a gear, a predetermined incremental rotational amount each time it receives a signal from the damper control system. The gear in turn is coupled, either magnetically or mechanically, to at least one of the plates, such that when the gear is rotated, it effects a corresponding rotation in the plates.

Another aspect of the present invention is an optional alarm to indicate when an airflow exists that is below the desired range and cannot be brought into an acceptable range through adjustment of the damper. Such a condition might occur, for example, if the HVAC system airflow supply or exhaust system is interrupted or blocked. In such a situation, no adjustment of the damper would be possible to adjust the airflow rate into the acceptable range. In that case, the control system can be programmed to sound an alarm or produce an alarm signal to indicate that there is likely to exist a problem elsewhere in the HVAC system.

Finally, the control system may have the capability of providing an output signal in a variety of formats, such as PROFIBUS, ASCII or other formats used in the HVAC industry, to transmit the flow rate of air at any given time. By routing the output signals from a number of individual control systems to a central location, the flow rates throughout an entire HVAC system can be monitored and controlled from a remote central location.

BRIEF DESCRIPTION OF THE DRAWINGS

In the drawings, like reference numerals and letters refer to like parts throughout the various views.

FIG. 4 is an enlarged exploded view of rotating plate structure in the valve that enables the adjustable control of airflow through the valve;

BEST MODE FOR CARRYING OUT THE INVENTION

Figure 1:
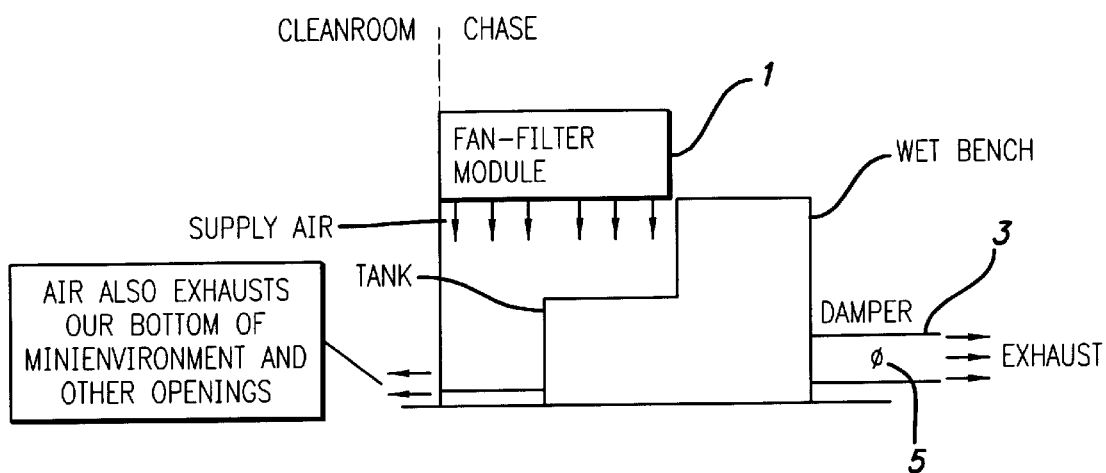
FIG. 1 is a schematic view of a conventional minienvironment and shows the location of an exhaust duct having a damper for controlling volumetric airflow through the exhaust duct.

FIG. 1 schematically illustrates a typical minienvironment system. Supply air is delivered into the minienvironment via a fan-filter unit or module 1. The supply air passes through the process tool area and is exhausted through a vent or ductwork, as shown at 3. In the prior art systems, a damper 5 is used to control the volumetric flow of the exhaust. This type of minienvironment system is familiar to those who are knowledgeable about silicon wafer manufacturing operations.

Figure 2:
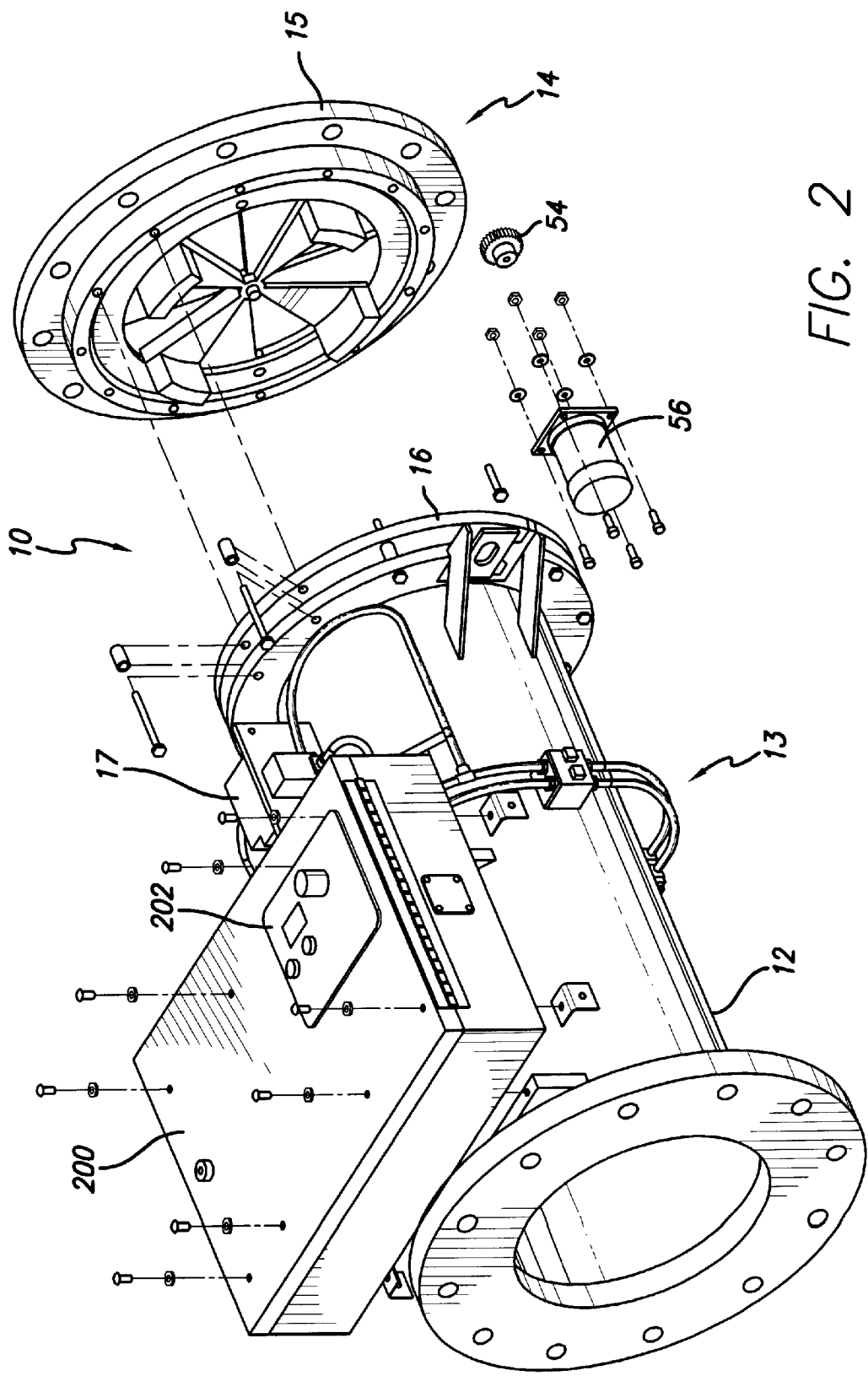
FIG. 2 is a partially exploded pictorial view of an exhaust valve system constructed in accordance with a preferred embodiment of the invention.

FIG. 2 illustrates an improved exhaust valve system 10 that is designed to replace the damper 5 shown in FIG. 1. The valve system 10 is designed for installation as a modular unit that can be installed in the exhaust ductwork of existing minienvironments without significant structural modifications. The valve system 10 has a tubular section or tube 12 that carries a volumetric flow sensing system 13 (described in greater detail below) and includes a mechanical arrangement of rotating plates (indicated generally at 14) that enable precise adjustment of airflow through the valve system. A circular flange 16 is connected to one end of the tube 12 to allow attachment of the rotating plate assembly 14. The rotating plate assembly 14 has a circular flange 15, which is connected to the circular flange 16 of the tube 12, to form a seal. If necessary for a particular application, the seal could be made airtight to prevent the escape of harmful vapors or chemicals. The flanges 15 and 16 may be bolted or otherwise securely fastened together.

Figure 4:
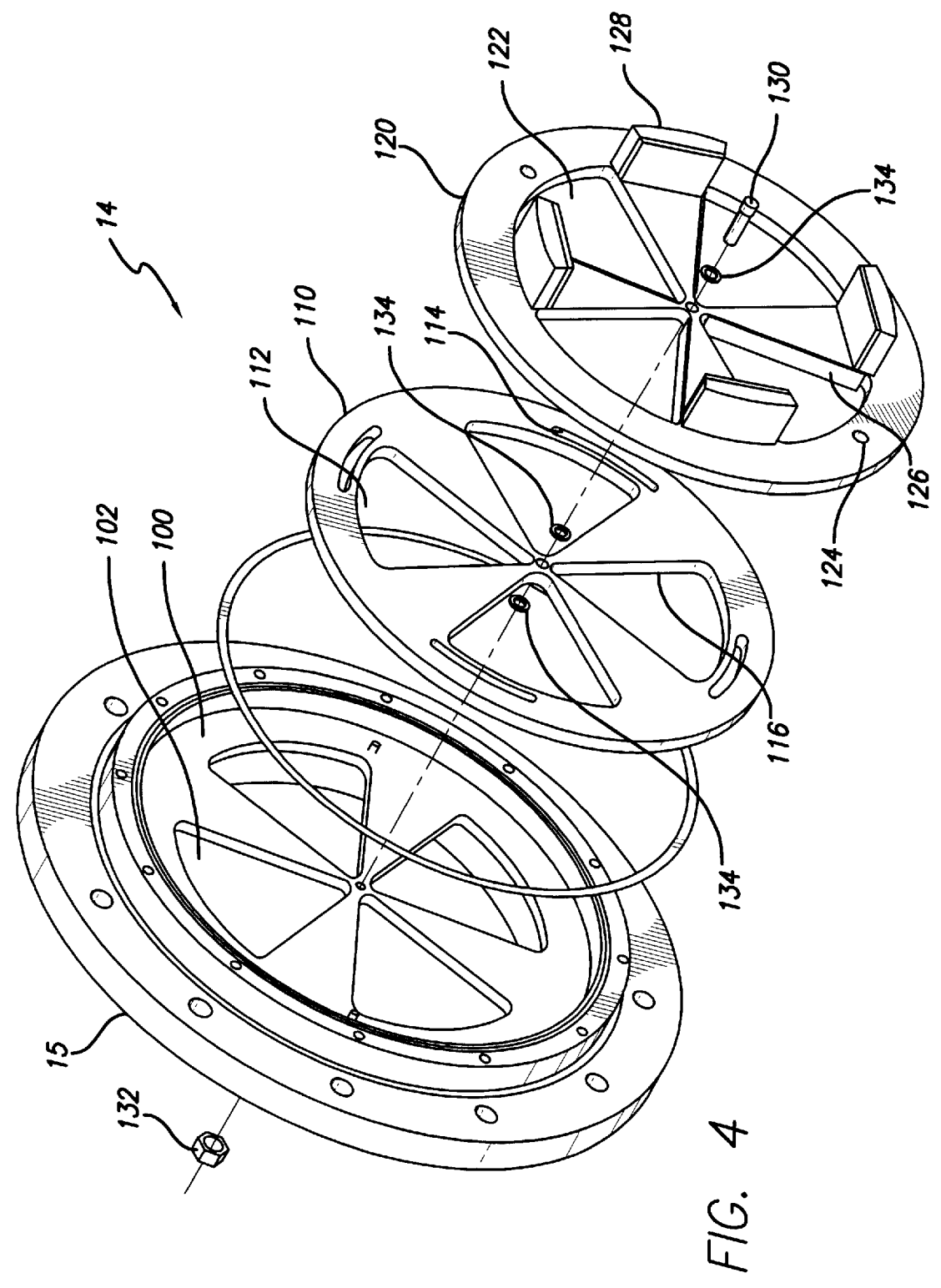

The various parts of the plate assembly 14 are shown in FIG. 4. Although in FIG. 3 and FIG. 4, a rotating plate assembly having three plates is shown, it will be apparent to one of ordinary skill in the art that two or any larger number of plates may be used.

The rotating plate assembly 14 has a first plate that is fixed in place. To the fixed plate 100 is rotably connected additional plates. FIG. 4 shows a second plate 110 and a third plate 120. The three plates may be connected using a fastener 130 passing through a corresponding opening in the center of each of the three plates and mating with a fastener 132. There may also be inserted between the plates washers 134 to aid in the attachment of the plates and relative rotation of the plates.

The fixed plate 100 has at least one opening 102 through which air can pass. The additional plates 110 and 120 have openings 112 and 122 identical in placement and size to those of the fixed plate 100. Although it is generally preferable to have matched openings, in some applications the openings would not be identical in placement or size. In FIG. 4, plates 100, 110, and 120 are shown with four openings shaped generally as wedges. The use of wedged-shaped openings has been found to provide good airflow characteristics through the openings. Generally openings with good airflow characteristics are those that provide as little turbulence as possible through a given size opening. Furthermore, for an assembly having three plates as is shown in FIG. 4, the sum of the area of the openings should be approximately two-thirds of the total area of a plate. For an assembly with four plates, the sum of the area of the openings should be approximately three-fourths of the total area of a plate. As will be explained in more detail below, such sizings of the openings will allow the plates to cooperatively interact with each other to completely close the duct.

In a preferred embodiment of the invention, the second plate 110 has at least one are-shaped slot 114 that is concentric with the plate and has a length equal to approximately one-half the length of the widest part of the opening 112. In this embodiment, the third plate 120 has a protrusion 124 facing the second plate located such that when the third plate is installed next to the second plate, the protrusion 124 extends into the slot 114 on the second plate 110.

When the three plates and associated hardware are assembled to form a rotating plate assembly 14, the plate assembly operates as follows. When the plates are in a first position such that the openings 102, 112, and 122 are all aligned with each other, the open area of the duct is approximately two-thirds the area of a plate. In this position, the protrusion 124 on the third plate is located at a first end of the slot 114 on the second plate. An external force is then applied to the third plate, causing it to rotate relative to the second plate, with the protrusion 124 on the third plate sliding along the slot 114 on the second plate. As the third plate is rotated, the solid portion of the third plate begins to overlap and block the open area of the first and second plates, thereby reducing the amount of open area in the duct.

The third plate may be rotated relative to the second plate in this manner without causing any rotation of the second plate until the protrusion 124 aligns with a second end of the slot 114. At this second position, any further rotation of the third plate would necessarily cause a corresponding rotation of the second plate. At this second position, half of the opening in the second plate is covered with the solid portion of the third plate, thereby causing the open area of the duct to be approximately one-third of the area of a plate.

Further rotation of the third plate when the protrusion 124 is at the second end of the slot 114 of the second plate causes the second plate to rotate with the third plate relative to the first plate. When the second and third plate are rotated into a third position, such that the solid portion of the second and third plates fully blocks the open area of the first plate, the open area of the duct is essentially eliminated. In this third position, the solid areas of the second and third plates overlap the open area of the first plate so that the duct is fully closed. Although the duct is in the fully closed position, leakage may occur through the gaps between the plates. In most applications it is not necessary to completely seal the duct. In this way, the second and third plates 110, 120 together function somewhat like a shutter valve in the way they overlap and in the way the rotary actuation of one plate drives the other plate. The third plate 120 can be moved only within a certain angular range. The valve 10 is fully open at one end of the range and fully closed at the other. It will be obvious to one of ordinary skill in the art that other mechanical means can be substituted for the protrusions 124 and slots 114, such as, for example, a ridge or other feature on a first plate that interferes with a ridge or other feature on a second plate. Such other features are found on shutter valves.

By incrementally varying the relative rotation of the first and second plates from the first through the third position, the amount of open area through the rotating plate assembly can vary infinitely from two-thirds open to completely blocked.

Although the above operation was described with reference to one protrusion 124 and a corresponding slot 114, the figure shows four protrusions and four corresponding slots. The purpose of having four engagement locations dispersed around the perimeter of the plates is to ensure that the force applied is even around the circumference of the plates, thereby reducing unequal torque that could cause wear or binding of the plates.

Although FIG. 4 shows wedge-shaped openings, other shapes such as a perforation pattern, slots, or other opening configurations that allow for sequential overlapping of open areas with solid portions can be used.

Instead of using a protrusion 124 that interfaces with a slot 114, an alternative method of coupling the plates together is described as follows. The front side of the plate 120 has a forwardly protruding flange 126 along one side of at least one wedge-shaped opening 122. Each flange 126 fits within the wedge-shaped opening of the second plate 110. When the third plate 120 is rotated in clockwise rotation, the flange 126 presses against one side 116 of the wedge-shaped opening in the second plate 110. As the third plate 120 continues to be driven in rotation, the openings in both plates 112, 122 eventually become congruent. In this way, the third plate 120 successively drives the second plate 110 to open the valve. When the third plate is rotated in the opposite direction, the protruding flange eventually becomes congruent with the opposite side of the opening, causing the second plate to be rotated, thereby closing the valve. Furthermore, the flange operates to improve the seal when the valve is in the closed position.

In a system (not shown) that used four plates instead of three plates, the operation would be the same, except that there would be an additional slot on the third plate that would cause its successive rotation after the fourth plate was rotated. The amount of open area of the duct between the first and fourth position could be infinitely varied between three-fourths open and completely blocked.

Figure 6:
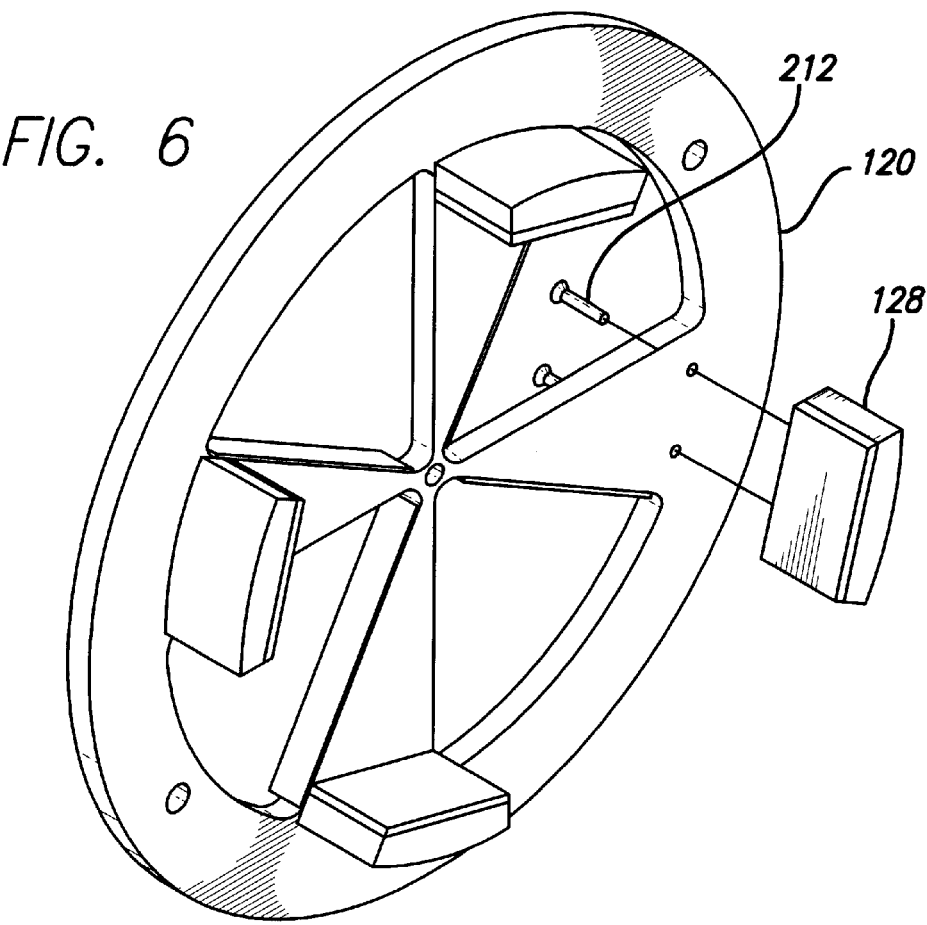
FIG. 6 is a view of a duct plate.
Figure 7:
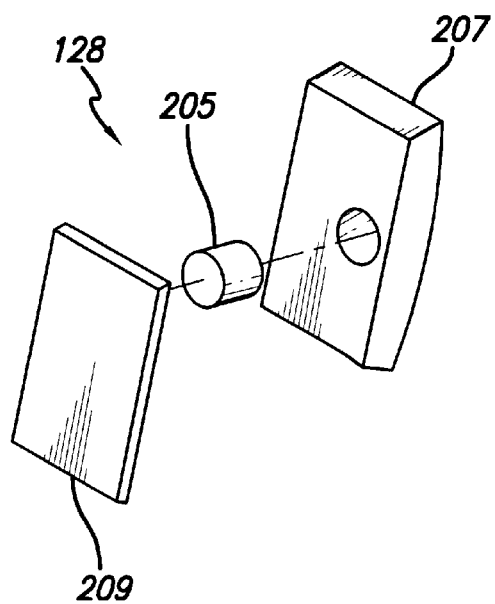
FIG. 7 is an exploded view of an interior magnet assembly.

Referring to FIG. 6, one method of applying force to the third plate 120 to cause its rotation within the duct is through use of at least two magnets. In such a system, the third plate 120 has at least one interior magnet assembly 128 affixed to a surface that faces away from plates 100 and 110. In the preferred design there are four interior magnet assemblies arranged at ninety-degree separations from each other. As shown in FIG. 7, each magnet 205 is installed between a block 207 and a back plane 209, such that its axis of polarity is radially oriented relative to the rotating axis of the plate. The interior magnet assemblies 128 may be affixed to the third plate using clamps, screws 212 or other secure fasteners.

Figure 5:
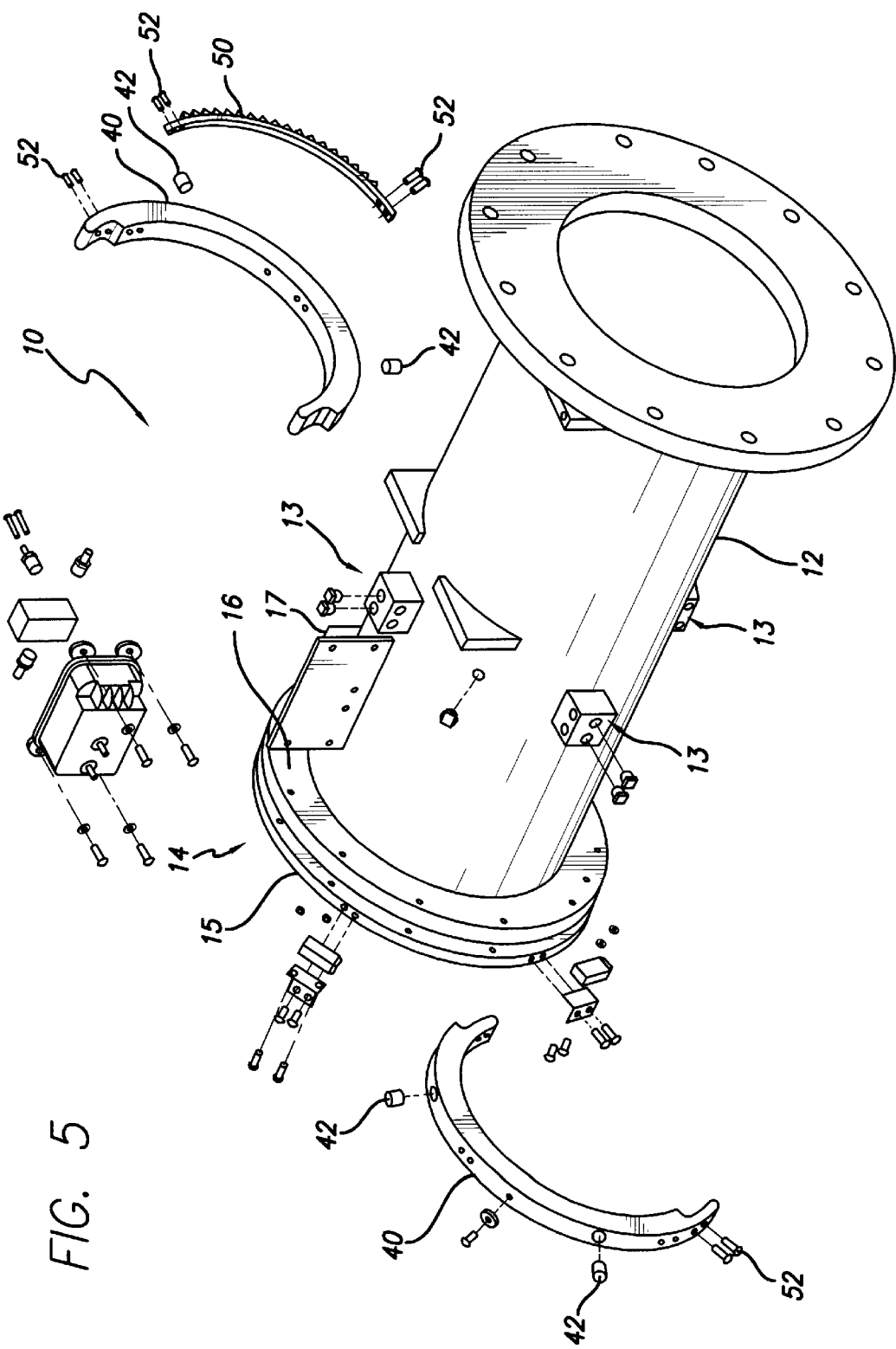
FIG. 5 is a partially exploded view showing the gear drive and magnet connection.

Referring to FIG. 2, the rotating plate assembly is attached to the main tube 12 using fasteners to achieve an air-tight seal between the rotating plate assembly and the main assembly. After installation, the interior magnet assemblies 128 of the rotating plate assembly are located within the tube aligned with a magnet ring 40. The magnet ring is rotatably engaged with the exterior of the tube in which the interior magnet assemblies 128 are located. As shown in FIG. 5, the magnet ring 40 may be separated into two pieces to aid in assembly. The magnet ring 40 is designed to receive at least one exterior magnet 42, corresponding to the number and location of interior magnet assemblies 128. Exterior magnets 42 are oriented such that their axis of polarity is in a radial direction relative to the axis of the duct, such that each pair of exterior magnets 42 and interior magnet assemblies 128 may magnetically interact. For example, if the interior magnet assemblies 128 are oriented such that the north polarity faces radially outward from the duct, the exterior magnets 42 will be oriented so that the south polarity faces radially inward toward the duct.

The amount of interaction between a pair of magnets is measured in terms of shear force required to break the interaction. It is important that the breakaway force be sufficient to allow a mechanical force to be applied to the magnet ring and the exterior magnets, causing a rotation of the magnet ring to transmit a corresponding force to the interior magnets, causing rotation of the plates. If the breakaway force is not sufficient, the pair or pairs of magnets will break away, and fail to cause rotation of the interior magnet assemblies. Experimentation has shown that the total breakaway force should be at least 20 pounds to ensure that the magnetic coupling will overcome any friction present in the rotating plate assembly. In what is believed to be the best mode, four magnets are used that provide a total breakaway force of 32 pounds.

Referring to FIG. 5, mechanical force is applied to the magnet ring 40 through a rack gear 50 attached to the outer surface of the magnet ring. The rack gear may be attached to the magnet ring by use of fasteners, such as screws 52. The pitch and dimensions of the teeth on the rack gear are sized to receive and interface with the teeth of a pinion spur gear 54 (see FIG. 2) attached to the axle of a stepper motor 56, which is attached to the tube 12.

As the axle of the stepper motor rotates, the pinion gear 54 rotates, which in turn causes the rack gear 50 and magnet ring 40 to rotate. Through magnetic coupling, rotation of the magnet ring causes the third plate 120 to rotate. Therefore, activation of the stepper motor causes the plates to rotate. Stepper motors and the type of gear arrangement just described are well known.

The valve system 10 is actuated when the stepper motor 56 drives the pinion spur gear 54 in a first rotational direction that, in turn, drives the rack gear, magnet ring, and third plate 120 in the opposite direction as the spur gear. When this happens, the third plate 120 initially rotates relative to the second plate 110 (plate 110 remains in the same position because the forward protruding flange 126 next to each wedge-shaped opening pulls away from surface 116 on the second plate 110). Depending on the direction of the rotation of the stepper motor, the valve is actuated into either an open or a closed position. Rotation of the stepper motor in the opposite direction actuates the valve in the opposite manner.

Figure 3:
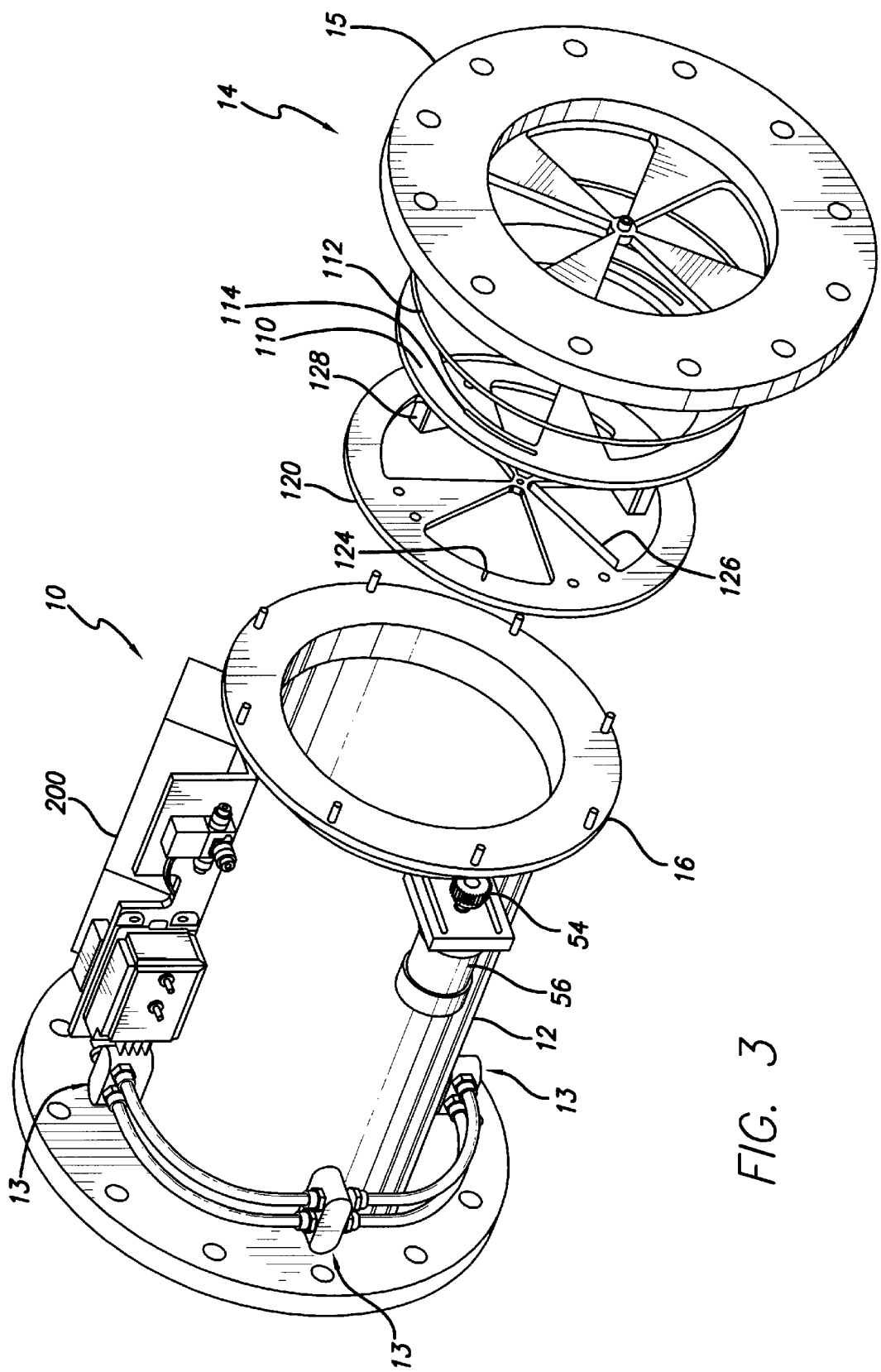
FIG. 3 is a partially exploded pictorial view of another embodiment of the exhaust valve system.

Referring to FIGS. 3 and 5, the valve system 10 is controlled by monitoring the volumetric airflow within the tube 12. It is difficult, however, to directly measure volumetric airflow. Instead, it is easier to measure the pressure drop across an obstruction, then calculate the corresponding volumetric airflow knowing the relationship between volumetric airflow and pressure for a given diameter tube.

In preferred form, to measure the pressure drop across the obstruction, a series of four pressure sensor units, shown generally at 13, are arranged substantially 90 degrees apart around the circumference of the duct. Each sensor unit consists of two taps facing radially into the tube (see FIG. 3) on either side of an obstruction (not shown). All upstream pressure ports, relative to the obstruction, are connected by a common tube which is then connected to the high side of the differential pressure transducer 17. The common air path in the tube averages the pressure from the four ports. This averaging acts to create a more accurate signal and lessens the effects of not having fully developed pipe flow. All downstream ports, relative to the obstruction, are similarly connected by a common tube which is then connected to the low side of the differential pressure transducer 17. The pressure transducer 17 determines the differential pressure and sends a corresponding signal to the programmable logic controller.

The determination of the pressure drop enables the calculation of the volumetric airflow rate through the tube 12 according to Bernoulli's Obstruction theory, using the equation:

$$Q = C\sqrt{\Delta P}$$

where Q is the flow rate in cubic feet per minute, C is the calibration constant, and $\Delta P$ is the measured pressure across the obstruction.

This method of calculating flow rate is well known. A dedicated signal processor can be utilized that monitors changes in the pressure difference on a continuous basis and makes responsive adjustments to the airflow rate through the valve system. It has been discovered that there is a closely linear relationship between the percentage of open area through the rotating plate assembly and the volumetric airflow through the valve. Consequently, the valve system provides precise control in the exhaust section of a clean room duct and the ability to adapt and adjust quickly to flow variations that result from changing conditions inside the minienvironment. In this way, the valve system can be used to maintain the "balance" of the minienvironment as described above.

To calculate the volumetric airflow passing through the valve using the pressure differential, a programmable logic controller ("PLC") (not shown) is used. The PLC and related circuitry is housed inside control unit 200. One of ordinary skill in the art will be able to design the circuitry to calculate the airflow rate given the pressure differential.

In addition, the system provides the ability to remotely monitor and control the airflow through the valve. The inputs needed to control the system are a voltage, possibly 24 volts, a signal to toggle between two preprogrammed set points, a signal line to make the valve fully open, and a signal to make the valve fully close. Once the valve is programmed to a particular set point, or a fully-open or fully-closed position, the circuitry will send a signal to drive the stepper motor to open or close the valve as needed to reach the desired flow rate. These signals can be sent through a user terminal 202 on the valve system 10. In addition to the user terminals, the valve can also be controlled and monitored using serial communications. One of ordinary skill will understand that the signals can be in any standard communication protocol format, such as ASCII, PROFIBUS, BACNET, or DEVICENET.

Although only two preprogrammed set points were provided in the example above, it would be possible to provide as many set points as desired. In a system in which all of the signals are sent to a central control system, any number of set points could be established to account for variable changes throughout the entire environment.

It is to be understood that the above description is not necessarily intended to limit the scope of what is considered to be the invention. Invention scope is to be limited only by the patent claim or claims that follow below.

What is claimed:

1. An airflow control valve comprising:
   at least a portion of an air flow duct;

a damper positioned within the duct;

at least one magnet connected to the damper; and a magnetic damper actuator positioned outside the duct such that movement of the actuator causes a corresponding movement of the damper, thereby actuating the damper to adjust the airflow through the duct;

wherein the damper is comprised of a plurality of rotatable plates, each plate having at least one airflow opening, wherein the plates are coupled together in a manner so that the rotary actuation of one plate may cause another plate to rotate, in a manner so that the plates cooperatively adjust the open area for airflow through the valve.

2. The valve of claim 1, further comprising a device for measuring the volumetric flow rate of air through the duct and a controller that actuates the damper in response to changes in the volumetric flow rate in such a way so as to maintain the volumetric flow rate at a predetermined level.

3. The valve of claim 2, further comprising a display panel that displays the volumetric flow rate.

4. The valve of claim 2, further comprising a communication system capable of transmitting data related to the valve, including volumetric airflow rate, to a remote location.

5. The valve of claim 2, wherein the flow rate measurement device comprises a plurality of pressure taps connected to a pressure transducer coupled to a programmable logic controller.

6. An airflow control device comprising:

an adjustable damper that restricts the airflow through a duct;

a means for adjusting the amount of airflow restriction created by the damper;

a means for determining the volumetric flow rate of air through a region of the duct; and a controller that automatically adjusts the amount of airflow restriction caused by the damper by a predetermined amount in response to a measured change in the volumetric flow rate;

wherein the damper comprises a plurality of plates each having at least one airflow opening, the plates being rotatable coupled together in a manner so that the rotary actuation of one plate may cause another plate to rotate, in a manner so that the plates cooperatively adjust the open area for airflow through the valve.

7. The airflow device of claim 6, wherein all components in contact with the airflow are resistant to chemicals present in the airflow.

* * * * *